United States Patent [19]

Toshima

[11] Patent Number: 4,994,128

[45] Date of Patent: Feb. 19, 1991

[54] METHOD FOR MANUFACTURING FILM ROLLS

[75] Inventor: Isao Toshima, Kawasaki, Japan

[73] Assignee: Asahi Chemical Polyflex, Ltd., Tokyo, Japan

[21] Appl. No.: 360,927

[22] PCT Filed: Jul. 27, 1988

[86] PCT No.: PCT/JP88/00751

§ 371 Date: Mar. 22, 1989

§ 102(e) Date: Mar. 22, 1989

[87] PCT Pub. No.: WO89/00967

PCT Pub. Date: Feb. 9, 1989

[30] Foreign Application Priority Data

Jul. 28, 1987 [JP] Japan .......................... 62-186611

[51] Int. Cl.[5] .............................. B32B 31/16

[52] U.S. Cl. .............................. 156/66; 156/192; 156/244.25; 383/63

[58] Field of Search .................. 156/66, 192, 244.25; 383/63

[56] References Cited

U.S. PATENT DOCUMENTS

| | | | |
|---|---|---|---|
| 1,884,783 | 10/1932 | Marcalus . | |
| 4,582,549 | 4/1986 | Ferrell | 156/66 |
| 4,694,959 | 9/1987 | Ausnit et al. | 206/390 |
| 4,859,259 | 8/1989 | Schneiber | 156/66 |

FOREIGN PATENT DOCUMENTS

| | | |
|---|---|---|
| 0089679 | 9/1983 | European Pat. Off. . |
| 2303705 | 8/1974 | Fed. Rep. of Germany . |
| 1411333 | 9/1964 | France . |

*Primary Examiner*—Robert A. Dawson
*Attorney, Agent, or Firm*—Armstrong, Nikaido, Marmelstein, Kubovcik & Murray

[57] ABSTRACT

A roll film (1) rolled around a winding core (2), having resin made fastener claws (3) and (4) of an engagement tool along with both edges of the film. The claws are melt-bonded to the film. The film (1) is wound in a serpentine manner relative to the winding core (2). This roll film may be incorporated into an automatic bag producing and filling machine without any intricate operation. When the roll film is paid off, it is possible to smoothly supply the film at a constant speed and to form a fastener claw provided bag with a high efficiency.

2 Claims, 4 Drawing Sheets

METHOD FOR MANUFACTURING FILM ROLLS

DESCRIPTION

1. Technical Field

The present invention relates to a roll film onto which fastener claws, made of resin, are melt-attached in advance, which film, as a whole, is tensioned uniformly, and to a method for producing such a roll film. According to the present invention, a part of a conventional automatically packaging and filling machine is modified so that the automatic packaging and filling work may be performed at substantially the same filling speed as that of the conventional machine without needs of particular skills.

2. Background Art

There has been proposed a conventional method for producing a film having fastener claws, as shown in Japanese Patent Examined Publication No. 45-35191, in which male and female claw dies having discharge outlets for male and female claws are fixedly arranged in a transverse direction of a film moving along bonding rolls, and molten synthetic resin is extruded from the male and female claw dies so that the male and female claws are, respectively, melt-formed in parallel in the vicinity of the opposite width edges.

The fastener claw film produced according to the above-described method is folded over in the transverse direction engaging the male and female claws with each other. Under such a condition, parts corresponding to a bottom edge and side edges are melt-bonded and the film is cut, thereby individual fastener claw provided packages. After articles are filled into the fastenable packages, opening portions are melt-bonded and sealed.

Also, Japanese Patent Examined Publication No. 48-11981 discloses a method in which a film that is folded over in the transverse direction and has fastener claws is supplied and filled with articles; thereafter, only part of the fastener claws is engaged with each other; after melt-bonding in the lateral direction and cutting work, the fastener claws are fully engaged with each other with upper parts of the fastener claws melt-bonded.

However, because the above-described film is provided with male and female claws which increase the thickness therealong, the film is non-uniformly raised when rolled, so that it is impossible to ensure uniform tension. Also, even if the film would be forcibly rolled, because the width of the fastener provided portions is small, the roll of film would be likely to be deformed with the thickened portions being displaced or offset. In other words, it would be impossible to roll the film With a uniform tension so that the roll of film may be supplied to a high performance package producing machine or an automatic package producing and filling machine. Therefore, a roll in the form of a barrel is actually used, or a low performance package producing machine, based upon a supply of an unstable fastener claw provided film, loosely rolled at a large thickness, is used.

The roll that may be supplied to the automatic package producing and filling machine meets the requirement that any crease must be avoided because it is necessary to pay off the film at a constant tension and at a constant supply rate. In addition, the roll must meet the requirement that the tension be always kept constant in the longitudinal direction of the film, and that the roll film as a whole may smoothly be rotated with a good balance. It has been necessary to provide a roll film for fastener provided packages or bags, which may be supplied to the automatic package or bag producing and filling machine.

DISCLOSURE OF INVENTION

An object of the invention is to overcome the above-noted disadvantages. According to the structure of the invention, a roll film wound around a winding core is characterized in that fastener claws, made of resin, are continuously melt-formed along both edge portions of the film, respectively, and the film is wound in a serpentine manner relative to the winding core. The film is further characterized in that fastener claws, made of resin, are continuously melt-formed along both edge portions of the film, respectively, and thereafter, the film is wound in a serpentine manner relative to the winding core.

A film used in the present invention may be layered in a single or plural layer. One surface of the film is capable of melt-bonding to resin extruded male and female claws, preferably, with the surface outside of these claws having a melt-bondability with lead liner, all extruded from molten synthetic resin extruded through dies. In order to ensure such melt-bonding, it is preferable to use a laminated film made of layers of material that may readily be thermally molten, such as polyethylene, polypropylene, ethylene-vinyl acetate copolymer and material, having sealability with a bondable material, such as nylon, vinylidene polychloride and polyester, for example. Otherwise, it is possible to use a laminated sheet made of metal foil such as aluminum foil and other material such as paper.

According to the present invention, a part, in the vicinity of the longitudinal centerline, of the roll film is used as a bag or package bottom, and male and female claws of the fastener are provided along both edge portions of the film as an engagement tool when the film is folded and the male and female claws are engaged. The "edge portions" mean parts located at one fifth or less of the film width from the respective film edge lines. Also, in the same manner as in the ordinary film engagement bag, the film with the engagement tool according to the present invention is provided for the sealed packages to be filled with articles. It is therefore sufficient that the male and female claws may be located if it is possible to ensure the above-described melt-bond width, an opening width due to the cut of the melt-bonded portion and an upper extra width needed for opening/closing the fastener, from the edge line of the film. As a matter of fact, the claw position is at 50 mm or less, more preferably, at 20 to 30 mm from the edge lines of the film.

It is preferable to provide, as a lead line, at least one, preferably, two thickened linear, tearable portions that are in parallel with each other at an interval near the melt-bonded portion but are separated by an extent corresponding to the upper extra portion outside of the fastener claw. Furthermore, upon the production of the bags, if a cutting trigger portion, such as a V-notch or an I-notch, is provided outside the thickened portion, or in the intermediate portion of the two thickened portion (in case of two thickened portions), the bag may manually be opened and at the same time, the broken line is guided in parallel with the engagement line. In addition, upon the opening/closing operation of the once opened bag, the edge portion of the film is increased to ensure the stability of handing of the bag. If the lead line is melt-bonded by extruding the resin for the fastener claws, the production may be simplified. The lead line may be provided outside either one of the male and female claws or the lead lines may be provided outside the male and female claws, respectively.

The synthetic resin forming the lead line and the male and female claws may be the same material as the material of the film on the side to be bonded with the lead line and the male and female claws or may be the material different from those. It is preferable to use the material having a flexibility and a high bondability with the film inside surface.

The configuration of the male and female claws for the fastener is selected so that a projection of the male claw is in intimate engagement with a recess of the female claw and the engagement and disengagement thereof may be repeatedly performed.

It is preferable that the configuration of the winding core around which the fastener provided film is to be wound is tubular. If desired, a reinforcement may be lined onto an inner side of the winding core, and the core in the form of a disc may be used if the film may be smoothly taken up on or paid off from the core.

It is general to use paper as a raw material. However, in some cases, it is possible to use plastic or any other material. In consideration of the fact that the now working ordinary automatic bag producing and filling machine is slightly modified for the application of the invention thereto, it is preferable to roll the fastener provided film around a paper core for the ordinary usage, having a module diameter of 3-inch, sometimes 6-inch or seldom an intermediate diameter therebetween. Accordingly, it is preferable that a diameter of the paper tube should include an industrially allowable error width as well as the above-described module diameter.

The present invention is characterized in that the above-described film is wound or rolled in a serpentine manner relative to the above-described winding core. Since remarkably thickened portions usually exist when the film is wound or rolled, with the edges being in alignment with each other, it is impossible to wind or roll the film at a uniform tension. It is therefore to propose to roll the film obliquely relative to the winding core. It is sufficient to provide such a displacement or offset that one fastener claw is not overlaid with the previously wound fastener claw. In order to wind the film obliquely relative to the winding core in this manner, it is necessary to increase a width of the winding core larger than the width of the film. If the film is wound by displacing the film to some extent in an oblique manner, the film edge lines will be in contact with one of the edges of the winding core. At this time, the oblique direction is switched over opposite to the previous direction in an oblique manner. By repeating this winding operation, it is possible to obtain the roll film whose role direction is reversed at an equal interval, that is, a film which has been rolled in a serpentine manner relative to the winding core.

A length of the winding core is equal to or larger than that of the winding portion on which the film is to be wound. The film to be wound thereon is of course narrower in width than the winding portion.

When the roll film, according to the present invention, is supplied to an automatically bag producing and filling machine, the fastener claws are engaged with each other without failure after paying off the film. Thereafter, a light pressure is applied to the parts to be engaged with each other so that such an engagement state is continued, and the film is guided to form a folded tubular shape. After this, in the same manner as in the conventional method, a longitudinal melt-bond is effected outside the fastener claws, and the lateral melt-bond, cutting, and filling operations are repeatedly performed, thus effecting the bag production and filling with seals in a continuous manner. Furthermore, it is preferable to provide the film pay-off mechanism with means for reciprocating in compliance with an interval at which the film is moved in a serpentine manner.

In the film according to the present invention, the male and female fastener claws as an engagement tool are melt-bonded directly with the film. Since the fastener claws are provided in the film, there are locally and remarkably thickened portions. However, when the film is wound around the winding core, the thickened portions of film which are brought into contact with each other are not overlaid one on another in an oblique manner, and the film oblique directions are switched over while keeping a constant interval. Namely, the serpentine roll ensures a positive winding method in which an uniform tension is applied to the film as a whole. Also, if the fastener claws are provided on both edges of the film, the raised portions due to the thickened portions of the roll film are dispersed rightwardly and leftwardly. As a result, the roll condition in which the weight balance as a whole may be effected. When the roll film is unwound for payoff, a smooth rotation and an equal speed payoff may be effected.

A film would be subjected to a slight strain due to the serpentine roll relative to the winding core. However, this strain would be absorbed by the flexibility of the film per se. It is made clear that this does not cause any actual problem.

According to the present invention, it is possible to provide the fastener provided roll film into the conventional automatic bag producing and filling machine and to operate it without any complicated skill. When the film is incorporated into the automatic bag producing and filling machine, the male and female fastener claws are used as a guide or indicator for folding the film. Thus, the automatic bag production and filling may effectively performed.

BRIEF DESCRIPTION OF DRAWINGS

The drawings show an embodiment of the invention.

BEST MODE FOR CARRYING OUT THE INVENTION

Figure 1:
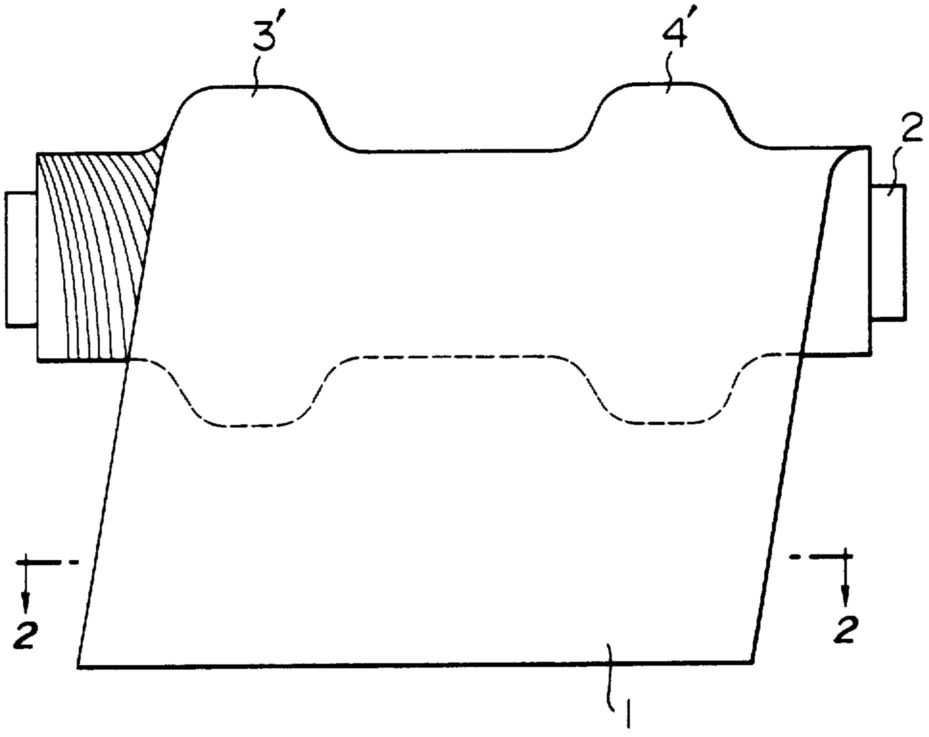
FIG. 1 is a side elevational view.
Figure 2:
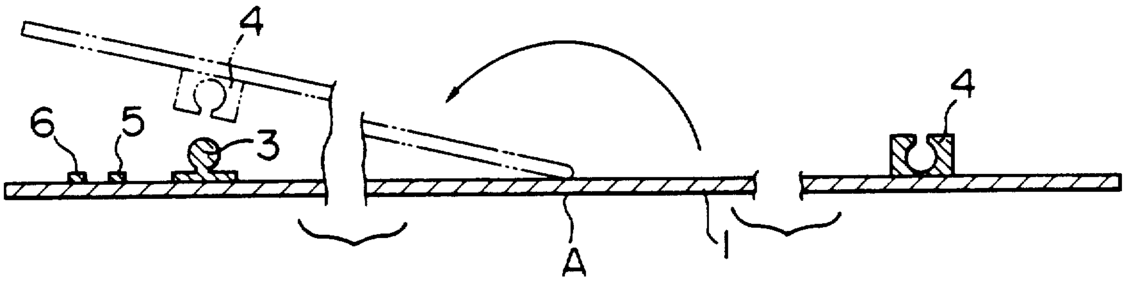
FIG. 2 is an enlarged cross-sectional view taken along the line II—II of FIG. 1.

FIG. 1 is a side elevational view of the invention, and FIG. 2 is an enlarged sectional view taken along the line II—II of FIG. 1.

Numeral 1 denotes a three-layered laminated film composed of nylon having a thickness of 20 microns, polyethylene having a thickness of 30 microns, and ethylene-vinyl acetate copolymer having a thickness of 20 microns. The film has a width of 600 mm. Fastener claws are provided on an inner surface of the film. FIG. 2 shows a detail of the fastener claws. Numeral 2 denotes a paper tube having a module diameter of 3 inches, which has non-wound portions at both ends and on which the film is wound only on its central portion. Numeral 3 denotes a male claw and numeral 4 denotes a female claw engaged with the male claw 3. The claws are melt-formed at positions away from each edge lines by 40 mm. Since the serpentine width is selected to 60 mm, the length of the winding portion is 720 mm.

When the film 1 is folded as indicated by the arrow in FIG. 2, the female claw will engage with the male claw from the position indicated by the phantom line. As a result, the position A formes a bag bottom. Numeral 5 denotes an inner lead line formed outside the male claw 3, and numeral 6 denotes an outer lead line formed outside the inner lead line 5 and in parallel therewith. Since the film having such thickened portions are wound in a serpentine manner, the thickened portions of the male and female fastener claws are raised at two locations in the form of projections 3', 4', as shown in FIG. 1. However, since the male and female fastener claws are provided at both edges, there is a good balance and the tension is kept constant at both the locations. Thus, it is possible to pay off the film at a constant speed.

Figure 3:
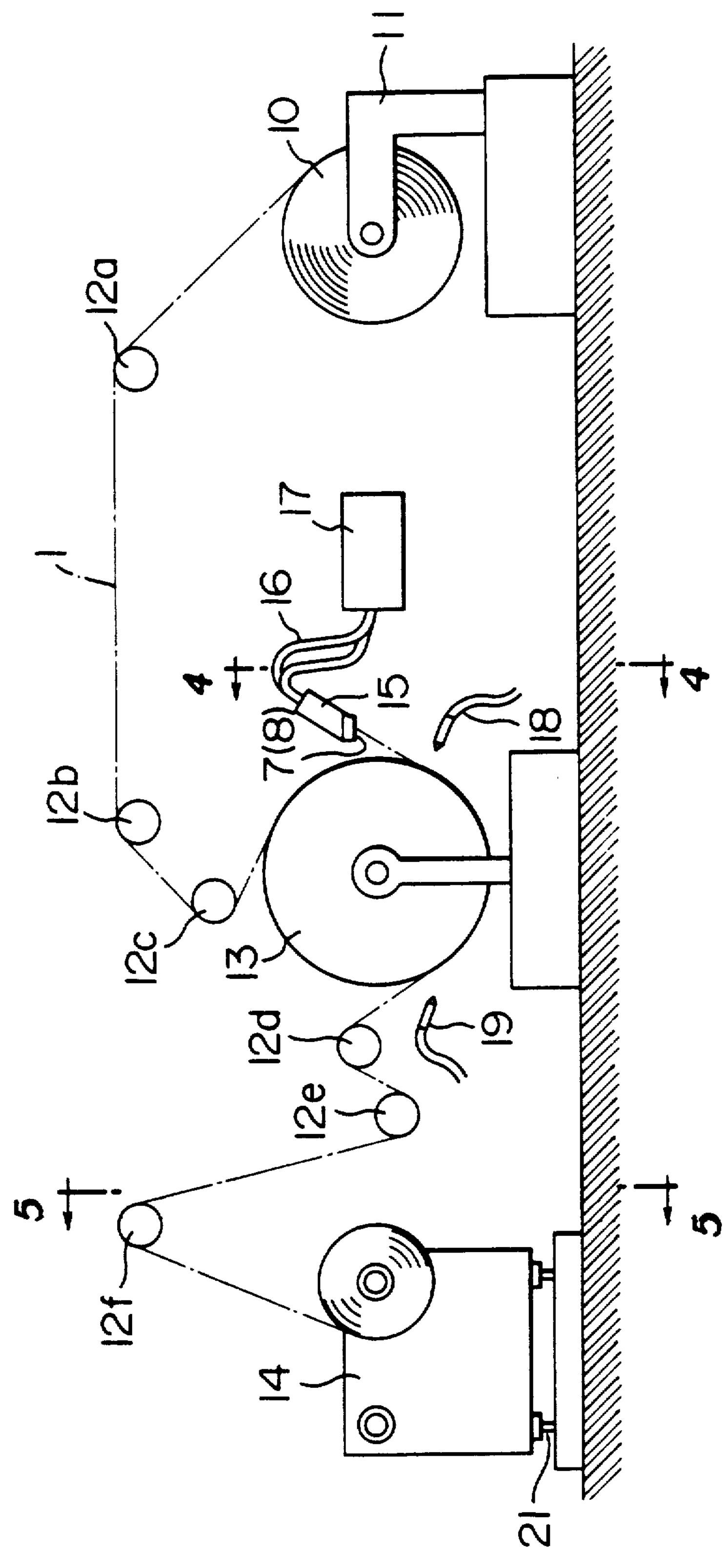
FIG. 3 is an illustration of an example of a roll film producing method.
Figure 4:
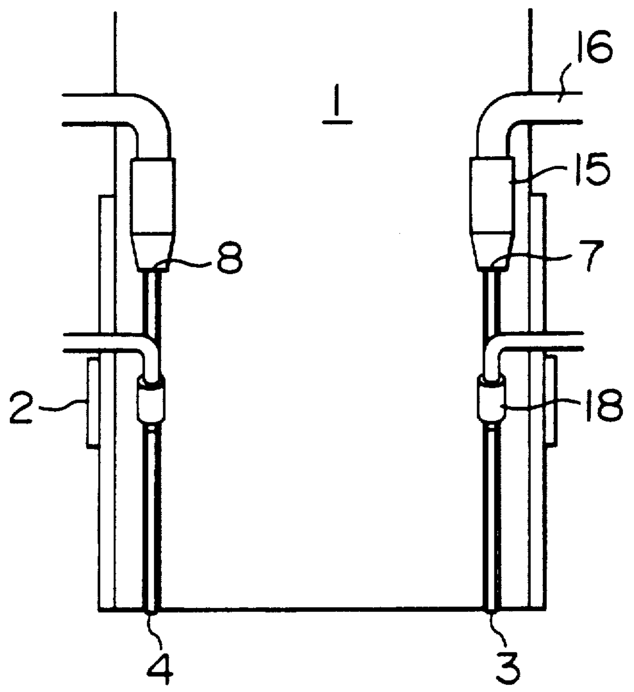
FIG. 4 is a perspective view as viewed in the direction IV of FIG. 3.
Figure 5:
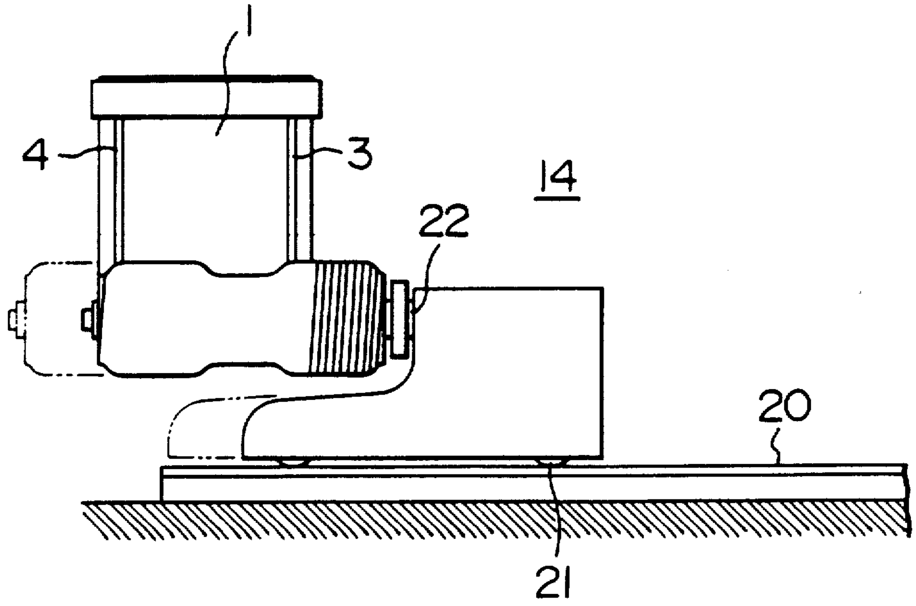
FIG. 5 is a perspective view as viewed in the direction V of FIG. 3.

A method for producing the roll film according to the invention will be explained. FIG. 3 is an illustration of the method in accordance with one embodiment of the invention; FIG. 4 is a perspective view as viewed in the direction IV of FIG. 3; and FIG. 5 is a perspective view as viewed in the direction V of FIG. 3.

Numeral 10 denotes a material roll of the film 1 which is rotatably supported on a material roll support base 11. The film 1 paid off from the material roll 10 is fed through guide rolls 12*a* to 12*c* to a bonding roll 13, is passed from the upper portion to the lower portion of the bonding roll 13 so as to be wrapped around the bonding roll 13, and is rolled through guide rolls 12*d* to 12*f* onto a take-up machine 14.

A male claw die 7 and a female claw 8 for extruding and forming the male and female claws 3 and 4, respectively, on the film 1 that moves and wraps along a surface of the bonding roll 13 are provided in the vicinity of the material roll 10 and are arranged in parallel in the axial direction of the bonding roll 13. As shown in FIG. 4, the male claw die 7 and the female claw die 8 are provided, respectively, in the vicinity of side edges of the film 1 that moves so as to wrap around the bonding roll 13. The male claw die 7 and the female claw die 8 have extruder ports for the male and female claws, respectively. Lead line extruder ports, not shown, are provided outside male claw die 7. These lead line extruder ports are used for extruding and forming lead lines 5 and 6 outside the male claw 3. Although, in this embodiment, the two lead lines are provided only on the side of the male claw extruder port, it is possible to provide the lead lines outside both the male and female fastener claws. Also, it is sufficient to provide a single lead line.

The male claw die 7 and the female claw die 8 are mounted, respectively, on die holders 15 that are movable in the axial direction of the bonding roll 13. A flexible hose 16 is connected at one end to each of the die holders 15. The flexible hoses 16 are used to feed molten synthetic resin from a distributor 17 to the male and female claw extruder ports. An extruder is connected to the extruder 17 so that the molten synthetic resin extruded from the extruder is supplied to the male and female dies 7 and 8 through the flexible hoses 16 by a metering pump.

Referring back to FIG. 3, the bonding roll 13 is drivingly rotated to guide the movement of the film 1 and to preheat the film 1 in order to enhance the molten bonding condition between the film 1 and the male and female claws 3, 4 and lead lines 5, 6 to be extruded and formed. This preheating may be performed over the entire width of the film. However, it is sufficient to perform the preheat at least the parts of the film 1 onto which the male claw 3, the female claw 4 and the lead lines 5 and 6 are to be melt-bonded.

Water nozzles 18 for injecting cooling water to the molten synthetic resin extruded from the male claw die 7 and the female claw die 8 are provided somewhat downstream of the male claw die 7 and the female claw die 8 so as to be directed to the bonding roll 13. The molten synthetic resin extruded from the male and female claw dies 7 and 8 is cooled by the cooling water injected from the water nozzles 18 and is fixed to form the male claw 3 and the female claw 4 and the lead lines 5 and 6.

Air nozzles 19 for spraying and removing the cooling water away from the film 1 are provided opposite side of the water nozzles 18 with respect to the bonding roll 8 so as to be directed in the tangential direction with respect to the bonding roll 13 downwardly. Therefore, the film is taken up by the take-up machine 14 under the condition that the cooling water attached to the film has been removed therefrom.

As shown in FIG. 5, the take-up machine 14 has at its lower end a plurality of wheels 21 that are reciprocated on the rails 20. A shaft 22 extending from the body is rotated to roll the film 1 and the body is repeatedly reciprocated, so that the film may be wound in a serpentine manner.

The film 1 that has been provided with the male claw 3 and female claw 4 and the lead lines 5 and 6 is rolled somewhat obliquely from one end to the other end of the winding portion of the paper tube 2. When the end edge line of the film 1 is brought into contact with the other end portion of the winding portion, the oblique direction is reversed so that the film is rolled somewhat obliquely to the one end of the winding portion. This rolling operation is repeated in accordance with the serpentine winding method. In particular, since the male claw 3, the female claw 4 and the lead lines 5, 6 are provided on side edge portions of the film 1, the raised portions due to the existence of these thickened 3', 4', are formed as smooth projections as shown in FIG. 1. Also, these raised portions are located on both the right and left side portions to facilitate the balance of the take-up roll. Therefore, it is possible to keep the tension constant when the film 1 is paid off, and it is possible to supply the film to the high speed automatic bag producing and filling machine located downstream of the roll film.

The roll film having the thus formed engagement tool has a length of 500 m and a roll diameter of 400 mm. On the other hand, according to the non-serpentine rolling method, the same film having the same length reaches the roll diameter of 800 mm. In addition, this roll is likely to be deformed with non-uniform tension. It would be impossible to perform a constant speed supply of the film.

In order to produce fastener provided bags from the thus obtained fastener provided film, the fastener provided film is paid off and is two-folded in the transverse or widthwise direction to engage the male and female claws. Subsequently, the portion outside the fastener claws, that is, the portion where the upper melt-fixture portion 9 is formed is longitudinally melt-fixed to form a tubular bag. The filling, the lateral bonding, and the cutting are repeatedly effected, so as to produce fastener provided sealed bag filled with articles.

The used automatic bag producing and filling machine was modified so that the pay-off machine of the conventional automatic bag producing and filling machine might be reciprocated in the axial direction in synchronism with the serpentine movement of the film and the film might be always supplied without any deformation.

Figure 6:
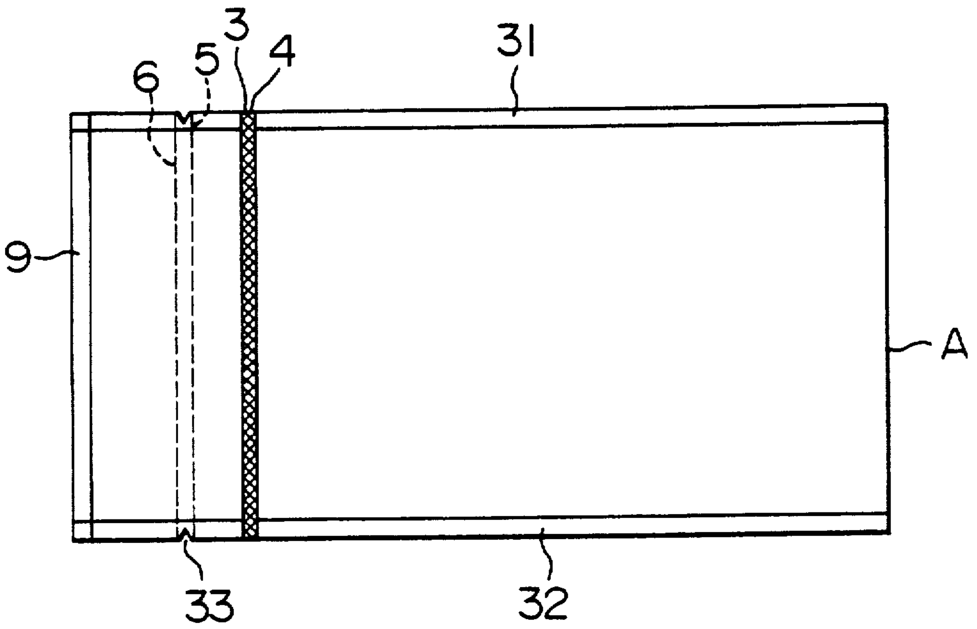
FIG. 6 is a plan view of a bag produced by using the film according to the present invention.

When such a machine was used to supply the roll film according to the invention, it was possible to continuously produce the fastener provided bags filled with the articles, as shown in FIG. 6. By using this film and the machine, it was possible to produce the fastener provided bag filled with articles at a high speed with a stability and positional accuracy in folding position and with a positive engagement between the male and female fastener claws. In FIG. 6, numerals 31 and 32 show the side melt-bonded portions, and numeral 9 denotes the upper melt-bonded portion. Numeral 33 denotes a V-notch. When the upper portion was drawn for opening, the tear was started from this notch portion and was guided by the inner and outer lead lines 5 and 6 to obtain a straight opening line.

According to this embodiment, the bag bottom is simply two-folded. However, it is possible to provide creases to perform a gazette fold.

INDUSTRIAL APPLICABILITY

The roll film with the fastener claws according to the invention may be used in the normal automatic bag producing and filling machine with a slight modification. It is possible to continuously perform the bag production, filling and sealing by melt-bonding the portion outside the fastener claws of the roll film in the longitudinal direction and repeating the lateral melt-bonding, the cutting and filling.

I claim:

1. A method for manufacturing film rolls, comprising the steps of: feeding a continuous strip of film along a path, melt-bonding resin-made male and female fastener claws to one surface of said film adjacent opposite edges of said film strip at fixed distances from said edges and, thereafter, without folding or wrinkling said film, winding said film on a winding core having an axial center while moving said core in an axial first direction a preset distance from said axial center and then in a second axial opposite direction a pre-set opposite distance from said axial center and obliquely winding said film strip on said winding core, with said male and female claws, respectively, on said film wound obliquely and off set on said male and female claws, respectively, on the immediately preceding wound film, said oblique winding direction of said film strip and said claws progressing on said winding core in a direction opposite to the direction of movement of said core and being reversed each time said core movement reaches a pre-set distance and is reversed, thus winding said claws, adjacent said opposite edges of said film strip being wound in a serpentine manner.

2. A method for manufacturing film rolls, comprising the steps of: feeding a continuous strip of film along a path, melt-bonding resin-made male and female fastener claws to one surface of said film adjacent opposite edges of said film strip at fixed distances from said edges, simultaneously therewith melt-bonding lead line to said one surface of said film adjacent one edge of said film strip outward of a fastener claw adjacent said one edge and, thereafter, without folding or wrinkling said film, winding said film on a winding core having an axial center while moving said core in an axial first direction a pre-set distance from said axial center and then in a second axial opposite direction a pre-set opposite distance from said axial center and obliquely winding said film strip on said winding core, with said male and female claws and said lead lines, respectively, on said film wound obliquely and off-set on said male and female claws and said lead-lines, respectively, on the immediately preceding wound film, said oblique winding direction of said film strip, said claws and said lead-lines on said winding core progressing in a direction opposite to the direction of movement of said core and being reversed each time said core movement reaches a pre-set distance and is reversed, thus winding said claws and said lead-lines, adjacent said opposite edges of said film strip being wound in a serpentine manner.

* * * * *